Figure 3:
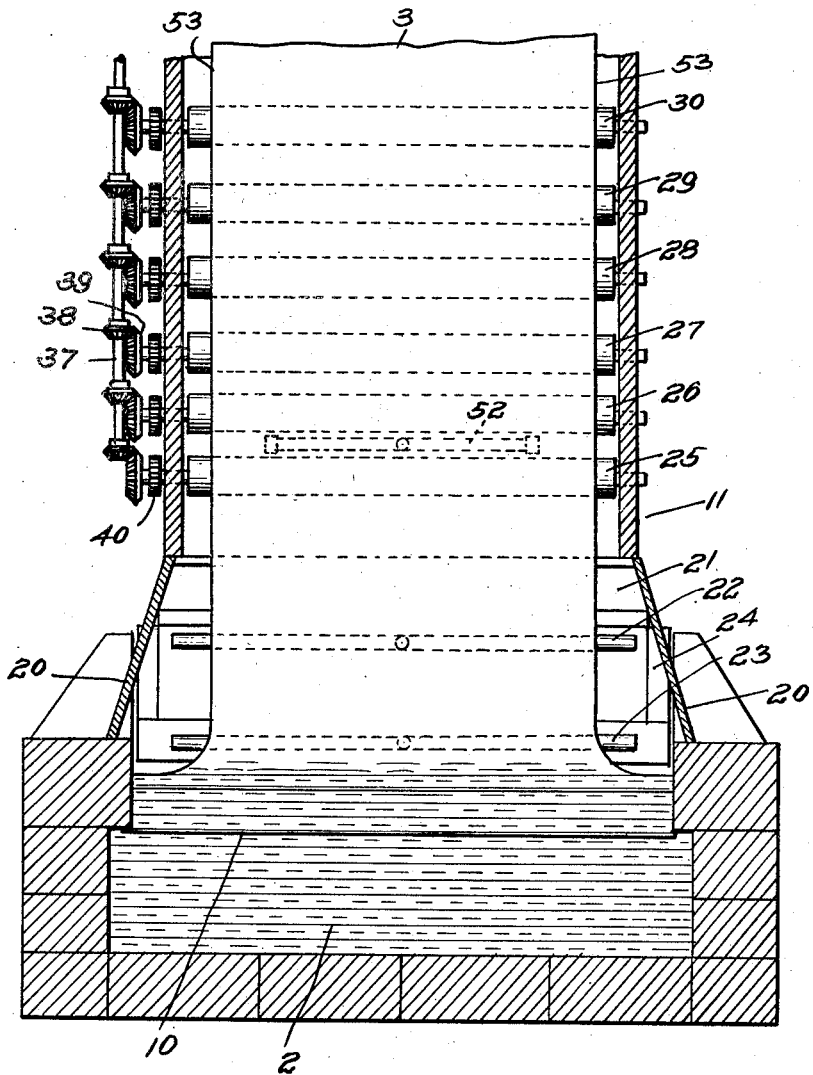

Sept. 7, 1926.
W. G. KOUPAL
1,598,730
PROCESS AND APPARATUS FOR MAKING SHEET GLASS
Filed August 12, 1925  2 Sheets-Sheet 1
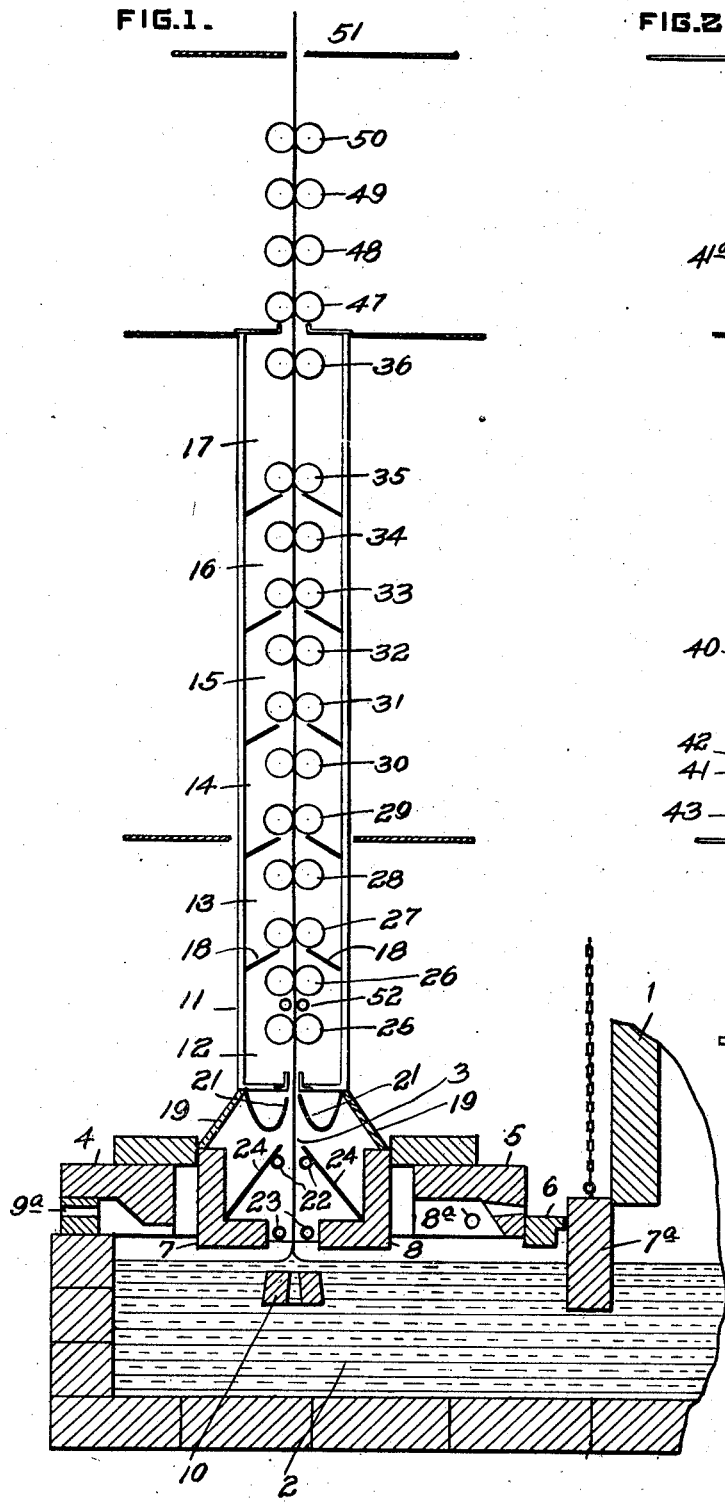
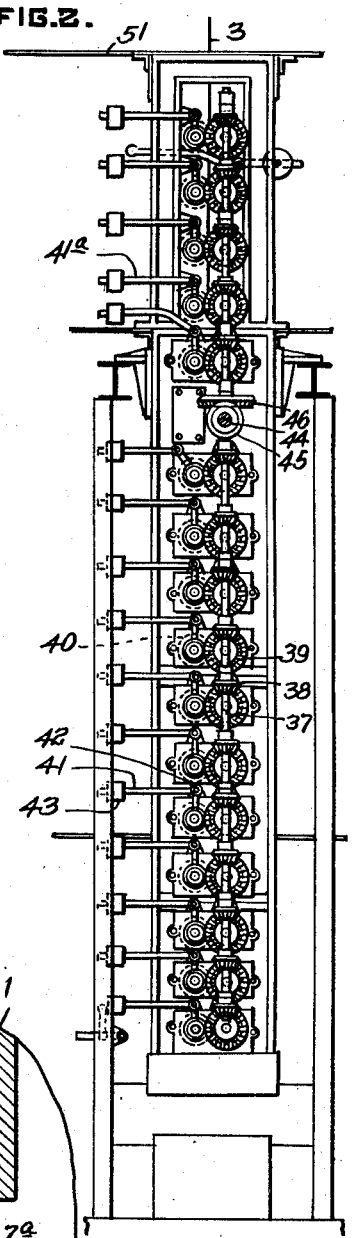
INVENTOR
W. G. Koupal
by
J. C. Bradley
Atty.

Patented Sept. 7, 1926.

1,598,730

UNITED STATES PATENT OFFICE.

WALTER G. KOUPAL, OF MOUNT VERNON, OHIO, ASSIGNOR TO PITTSBURGH PLATE GLASS COMPANY, A CORPORATION OF PENNSYLVANIA.

PROCESS AND APPARATUS FOR MAKING SHEET GLASS.

Application filed August 12, 1925. Serial No. 49,743.

The invention relates to a process and apparatus for drawing sheet glass continuously from a molten bath and annealing it by passing it through a vertical casing divided into a series of compartments by the use of transverse partitions. During its passage through the annealing casing to the top where it is cut off, the temperature of the glass drops from approximately 1050 or 1100 degrees F. to 300 to 200 degrees F., and it often happens that a crack develops in the sheet extending longitudinally thereof and usually at or near the center line of the sheet. A crack, so developed, may persist for a long period of time, thus materially reducing the value of the product. My improvement is directed toward preventing this cracking, which I have found can be avoided by applying heat to the central portion of the sheet just after it enters the casing and at a level where the normal temperature of the glass lies within the critical annealing range, namely between 1050 and 950 degrees F. This heat may be applied by the use of various types of heating apparatus or elements, but that preferred consists of gas burners in the form of a pair of perforated or slotted pipes located on opposite sides of the sheet closely adjacent the surfaces of the glass and terminating at each end short of the edges of the sheet. By way of example, I have found that the desired result has been satisfactorily achieved in the production of a fifty inch sheet by the use of burners about twenty-six inches long, so that the ends of the burners terminate twelve inches from the edges of the sheet. The amount of heat required is not great, and is best applied by having the burners close to the glass, so that the relatively low flame therefrom impinges upon the glass. When this expedient is employed, the longitudinal cracks will ordinarily not start, but in case such a crack does start, it will not persist but will turn sidewise to one of the edges of the sheet, so that the loss of glass is not great. The apparatus is illustrated in the accompanying drawings, wherein:

Figure 1 is a vertical section through the apparatus, diagrammatic in so far as the leer is concerned. Fig. 2 is a side elevation of the apparatus. And Fig. 3 is a partial vertical section taken in a plane at right angles to that of Fig. 1.

Referring to the drawings 1 is the end of a melting tank, preferably of the regenerator type and 2 is a forehearth or extension leading from the melting tank from which the glass sheet 3 is drawn. Lying above the surface of the glass in the forehearth are the cover members 4, 5 and 6 and the L blocks 7 and 8, between the latter of which the sheet is drawn. The gate or shear cake 7ª acts as a skimming device between the melting tank and forehearth, and when in raised position, permits a communication above the surface of the glass between the melting tank and the forehearth. Supplemental heating means for the forehearth are provided by suitable burners directed through the openings 8ª and 9ª, and a transverse guiding and chilling bar 10 of refractory material is provided beneath the line of generation of the sheet.

Located above the bath is the annealing leer in the form of a vertical casing 11 divided into the compartments 12, 13, 14, 15, 16 and 17 by means of the pairs of inclined partition plates 18, 18. The space above the glass bath through which the sheet is drawn before it reaches the leer is preferably closed in by suitable side plates 19, 19 and end plates 20, 20. Plates 21, 21 are also provided beneath the lower end of the leer and of the shape indicated, such plates serving to form a partial closure for the bottom of the compartment 12 and also serving to catch any broken glass which might otherwise fall from the compartment 12 into the glass bath. In order to chill the glass as it is drawn upward from the bath, the pairs of transverse water cooled pipes 22, 22 and 23, 23 are employed, the pipes 22, 22 serving as a support for the upper ends of the inclined metal shielding plates 24, 24.

Extending transversely of the leer for drawing the glass sheet 3 are the pairs of driven rollers 25 to 36, such rolls being made of asbestos discs or being covered with asbestos. The means for driving the rolls will be seen by reference to Fig. 2, in which 37 is a driven countershaft provided with the bevel pinions 38 meshing with the bevel gears 39 carried by the ends of the roll shafts lying on one side of the casing. These roll shafts are also provided with spur gears meshing with the spur gears 40 on the roll shafts lying on the other side of the casing. These latter roll shafts are carried upon the ends of the bell crank levers 41 pivoted at 42 and provided with the counter-weights 43. In this manner, the left hand set of rolls is pressed yieldingly toward the other set, so that breakage of the glass is avoided in case such glass is not perfectly flat and true. The countershaft 37 is driven from the drive shaft 44 extending at right angles to the shaft 37 and provided with a pinion 45 meshing with the bevel gear 46. After the glass emerges from the upper end of the gear casing 11, it passes between the pairs of rolls 47 to 50, such rolls being similar in construction to the rolls 25 to 36 and being similarly driven from the countershaft 37 as indicated in Fig. 2. The left hand members of these pairs are pressed yieldingly toward the other rolls by the use of the counterweighted levers 41ª corresponding in all particulars to the levers 41 heretofore referred to. After the glass emerges from the last pair of rollers 50, it passes upward through the take-off floor 51 upon which floor the cutters stand and cut the sheet or ribbon in suitable lengths. The glass at this point has been reduced to a temperature suitable for cutting and handling.

The compartments 12 to 17 are of progressively decreasing temperature so that the glass is properly annealed and reduced in temperature during its upward passage through a distance of approximately twelve feet. The glass in its passage through the lowermost compartment 12 has a temperature lying in the critical annealing range, that is, between 1050 and 950 degrees F. and it is in this compartment that the supplemental heating means, heretofore referred to, is applied to prevent the longitudinal cracking of the glass are located. This heating means consists of a pair of perforated burner pipes 52, 52 arranged, as indicated in Fig. 3, with its ends terminating short of the side edges 53, 53 of the glass sheet. The length required for these burner pipes and the distance short of the edges of the sheet at which their ends terminate must be determined by trial, but as heretofore stated, as a specific example, the desired result has been secured by the use of burner pipes twenty-six inches long upon a sheet of glass fifty inches in width, so that the ends of the burner pipes are about twelve inches from the edges 53. The pipes may be made longer without adversely affecting the result, but the heating of the edge portions is unnecessary, and involves a greater fuel consumption. These burner pipes are supplied with a mixture of gas and air through suitable connections, not shown, and the invention is not limited to the use of any particular type of heating means, as other devices, such as electrical heating elements might be used for accomplishing the desired purpose. The heat applied by means of these elements is not sufficient to soften the glass and the flames from the burner pipes are not at all sharp, so that there is no marking or lining of the glass due to the contact with the flame from the pipes. The amount of heat necessary to prevent cracking of the glass may be readily determined by trial for each particular case. The application of the reheating means applies a temper to the central portion of the glass, giving it greater strength, so that any crack which starts at the center, will turn laterally, instead of continuing along the central portion. The temper, thus applied, is due to the fact that the burners 55 merely heat the glass locally, without greatly heating the atmosphere within the leer, so that after passing the burners, there is a relatively sharp drop in the temperature of the glass, hardening or tempering it and adding to its resistance to cracking.

What I claim is:

1. Apparatus for drawing sheet glass from a molten bath, comprising a vertical casing mounted above the bath and provided with a series of transverse partitions dividing the casing into a plurality of compartments, pairs of driven rollers mounted in the casing for carrying the glass sheet upward therethrough, and a pair of heating members on opposite sides of the glass sheet and extending transversely thereacross, and located at a level in the casing where the temperature of the glass before heating by said members lies in the critical annealing range.

2. Apparatus for drawing sheet glass from a molten bath, comprising a vertical casing mounted above the bath and provided with a series of transverse partitions dividing the casing into a plurality of compartments, pairs of driven rollers mounted in the casing for carrying the glass sheet upward therethrough, and a pair of heating members on opposite sides of the glass sheet and extending transversely thereacross, and located at a level in the casing where the glass before heating by said members has a temperature lying between 1050 and 950 degrees F.

3. Apparatus for drawing sheet glass from a molten bath, comprising a vertical casing mounted above the bath and provided with a series of transverse partitions dividing the casing into a plurality of compartments, pairs of driven rollers mounted in the casing for carrying the glass sheet upward therethrough, and a pair of gas burners extending transversely of the sheet on opposite sides thereof at a level adjacent the lower end of the casing where the glass before heating by said burners has a temperature lying between 1050 and 950 degrees F.

4. Apparatus for drawing sheet glass from a molten bath, comprising a vertical casing mounted above the bath and provided with a series of transverse partitions dividing the casing into a plurality of compartments, pairs of driven rollers mounted in the casing for carrying the glass sheet upward therethrough, and a pair of heating members on opposite sides of the glass sheet at a level in the casing where the temperature of the glass before heating by said members lies in the critical annealing range, the said members being arranged to apply heat to the central portion of the sheet in excess of that applied to the edges thereof.

5. A process for making sheet glass which consists in drawing a sheet vertically from a molten body of glass, passing the sheet through an enclosed space in which the temperature of the atmosphere surrounding the glass is gradually reduced to anneal the sheet, and applying heat to the glass on each side thereof throughout limited areas terminating short of the edges of the sheet and at a level where the glass passes through its critical annealing range, to raise its temperature substantially above that of the surrounding atmosphere of the leer, so that after said reheating, the temperature of the glass drops sharply.

In testimony whereof, I have hereunto subscribed my name this 23 day of July, 1925.

WALTER G. KOUPAL.